US012377427B1

(12) United States Patent
He

(10) Patent No.: US 12,377,427 B1
(45) Date of Patent: Aug. 5, 2025

(54) AIRBRUSH WITH QUICK SWITCHABLE ATOMIZATION MODE

(71) Applicant: Ningbo Fenghua Likangni Cross border E-commerce Co., Ltd, Zhejiang (CN)

(72) Inventor: Liangjie He, Zhejiang (CN)

(73) Assignee: Ningbo Fenghua Likangni Cross border E-commerce Co., Ltd, Zhejiang (CN)

( * ) Notice: Subject to any disclaimer, the term of this patent is extended or adjusted under 35 U.S.C. 154(b) by 0 days.

(21) Appl. No.: 19/186,782

(22) Filed: Apr. 23, 2025

(51) Int. Cl.
*B05B 12/00* (2018.01)
*B05B 7/24* (2006.01)
*B05B 12/18* (2018.01)

(52) U.S. Cl.
CPC .......... *B05B 12/002* (2013.01); *B05B 7/2429* (2013.01); *B05B 7/2478* (2013.01); *B05B 12/18* (2018.02)

(58) Field of Classification Search
CPC ..... B05B 12/002; B05B 12/18; B05B 7/2429; B05B 7/2478
USPC ......... 239/300, 343, 344, 407, 416.4, 416.5, 239/417, 417.5, 418
See application file for complete search history.

(56) References Cited

U.S. PATENT DOCUMENTS 1,736,356 A * 11/1929 Mueller ................ B05B 7/0815 239/300
1,779,992 A * 10/1930 Reyher .................... A61B 5/22 73/862.51
3,232,540 A * 2/1966 Cassanmagnago ... B05B 7/1272 239/416
3,642,249 A * 2/1972 Cruse ........................ F16K 3/26 251/344
4,613,074 A * 9/1986 Schulze .................. B08B 3/026 137/12
5,141,161 A * 8/1992 Anderson ................. B05B 7/12 239/290
5,152,460 A * 10/1992 Barty ...................... B05B 7/068 239/300
5,180,104 A * 1/1993 Mellette ................ B05B 7/0081 239/296

* cited by examiner

*Primary Examiner* — Jason J Boeckmann
(74) *Attorney, Agent, or Firm* — Hawaii Patent Services; Nathaniel K. Fedde; Kenton N. Fedde

(57) ABSTRACT

The present disclosure provides an airbrush with an adjustable atomization mode, comprising a airbrush body and a nozzle assembly installed at one end of the airbrush body. The nozzle assembly is used to spray atomized liquid and comprises an air cap and an adjustment mechanism for regulating the spray pattern of the atomized liquid. The adjustment mechanism comprises an switchable ring movably arranged on the air cap, with an air guide chamber between the switchable ring and the air cap. The adjustment mechanism further comprises an air delivery channel and an air jet channel formed on the housing and extending toward the air guide chamber, and the air delivery channel can deliver gas to the air jet channel.

20 Claims, 4 Drawing Sheets

AIRBRUSH WITH QUICK SWITCHABLE ATOMIZATION MODE

TECHNICAL FIELD

The present disclosure relates to the technical field of airbrushes, particularly to an airbrush with quick switchable atomization mode.

BACKGROUND

Airbrushes are the primary tools used in spraying operations. They utilize liquid or compressed air for rapid release as a power source, spraying materials such as paint in atomized form onto object surfaces, thereby achieving uniform and efficient spraying operations.

The existing U.S. patent with a publication number of US20030006322A1 discloses an invention titled "Modular Fluid Spray Gun." This patent adopts a modular design, switching atomization patterns by replacing different nozzle components. However, this method of switching atomization modes by replacing nozzle components is cumbersome, time-consuming, and labor-intensive, reducing efficiency and increasing costs.

Therefore, there is a need to propose a new type of airbrush to address the aforementioned issues.

SUMMARY

The present disclosure provides an airbrush with quick switchable atomization mode to solve the problems mentioned in the background technology.

To achieve the above inventive object, the present disclosure adopts the following technical solution:

An airbrush with quick switchable atomization mode comprises a airbrush body and a nozzle assembly installed at an end of the airbrush body, the nozzle assembly being configured to spray atomized liquid, wherein the nozzle assembly comprises an air cap and an adjustment mechanism for regulating a spray pattern of the atomized liquid; and the adjustment mechanism comprises an switchable ring movably arranged on the air cap, with an air guide chamber between the switchable ring and the air cap; and the adjustment mechanism further comprises an air delivery channel and an air jet channel formed on the air cap and extending toward the air guide chamber, wherein the air delivery channel is capable of delivering gas to the air jet channel; and the switchable ring has a first position and a second position, wherein when the switchable ring is in the first position, the air delivery channel and the air jet channel are connected through the air guide chamber, and the air jet channel sprays gas to form a fan-shaped spray pattern of the atomized liquid; and the switchable ring is provided with a partition part, wherein when the switchable ring is in the second position, the partition part blocks the connection between the air delivery channel and the air jet channel, causing the nozzle assembly to spray atomized liquid in a circular pattern.

The present disclosure further provides an airbrush with quick switchable atomization mode, comprising a airbrush body and a nozzle assembly installed at one end of the airbrush body, the nozzle assembly being configured to spray atomized liquid, wherein the nozzle assembly comprises an air cap and an adjustment mechanism for adjusting the spray pattern of the atomized liquid; and the adjustment mechanism comprises an switchable ring movably arranged on the air cap, with an air guide chamber between the switchable ring and the air cap; and the adjustment mechanism further comprises an air jet channel and an air delivery channel that is capable of delivering air to the air jet channel; and the switchable ring has a first position and a second position, wherein when the switchable ring is in the first position, the air delivery channel and the air jet channel are connected through the air guide chamber, and the air jet channel sprays gas, causing the atomized liquid to form a first pattern; and the switchable ring is provided with a partition part, wherein when the switchable ring is in the second position, the partition part blocks the connection between the air delivery channel and the air jet channel, causing the nozzle assembly to spray atomized liquid in a second pattern.

BRIEF DESCRIPTION OF DRAWINGS

The drawings, which form part of this application, are included to provide a further understanding of the present disclosure. The illustrative embodiments of the present disclosure and the descriptions thereof are used to explain the present disclosure and do not constitute an undue limitation of the present disclosure. In the drawings.

Figure 1:
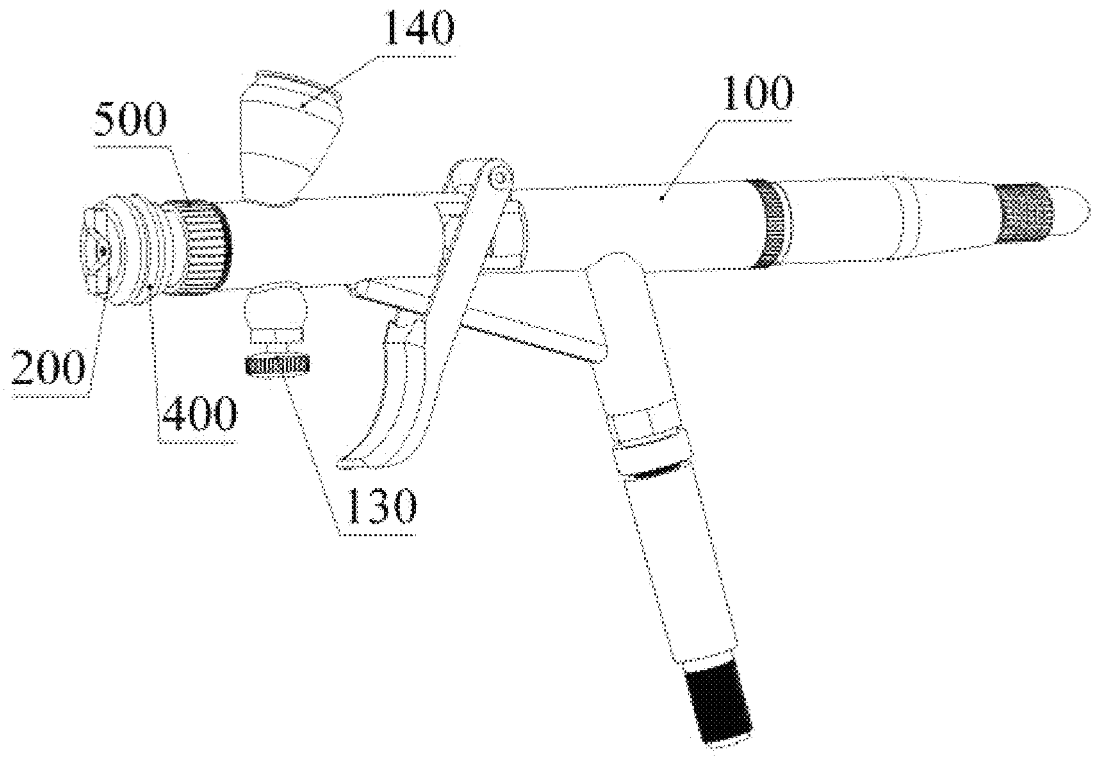
FIG. 1 is a schematic structural diagram of the present disclosure.

Reference signs: Airbrush body (100); Air Inlet Port (110); Air Inlet Channel (120); Adjustment Valve (130); Atomizing Material Cup (140); Air Cap (200); Air Delivery Channel (210); Air Jet Channel (220); Atomizing Protrusion (230); Central Air Passage (240); Nozzle (300); Air Guide Groove (310); Switchable Ring (400); Air Guide Chamber (410); Partition Part (420); Mounting Slot (430); Sealing Ring (440); Fastening Nut (500).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

As shown in FIGS. 1 to 6, an airbrush with quick switchable atomization mode a airbrush body 100 and a nozzle assembly installed at one end of the airbrush body 100 for ejecting atomized liquid. The nozzle assembly includes an air cap 200 and an adjustment mechanism, and the adjustment mechanism is used to regulate the spray pattern of the atomized liquid. The adjustment mechanism includes an switchable ring 400 movably mounted on the air cap 200, and an annular air guide chamber 410 is formed between the switchable ring 400 and the air cap 200. The adjustment mechanism further includes an air jet channel 220 and an air delivery channel 210 that supplies air to the air jet channel 220. The switchable ring 400 has a first position and a second position. When the switchable ring 400 is in the first position, the air delivery channel 210 communicates with the air jet channel 220 through the air guide chamber 410, the airflow flows through the air jet channel 220 and is ejected therefrom to shape the atomized liquid droplets, causing the atomized liquid to form a first pattern. The switchable ring 400 is provided with a partition part 420 that, when in the second position, isolates the air delivery channel 210 from the air jet channel 220, maintaining the atomized liquid in a second pattern.

Figure 2:
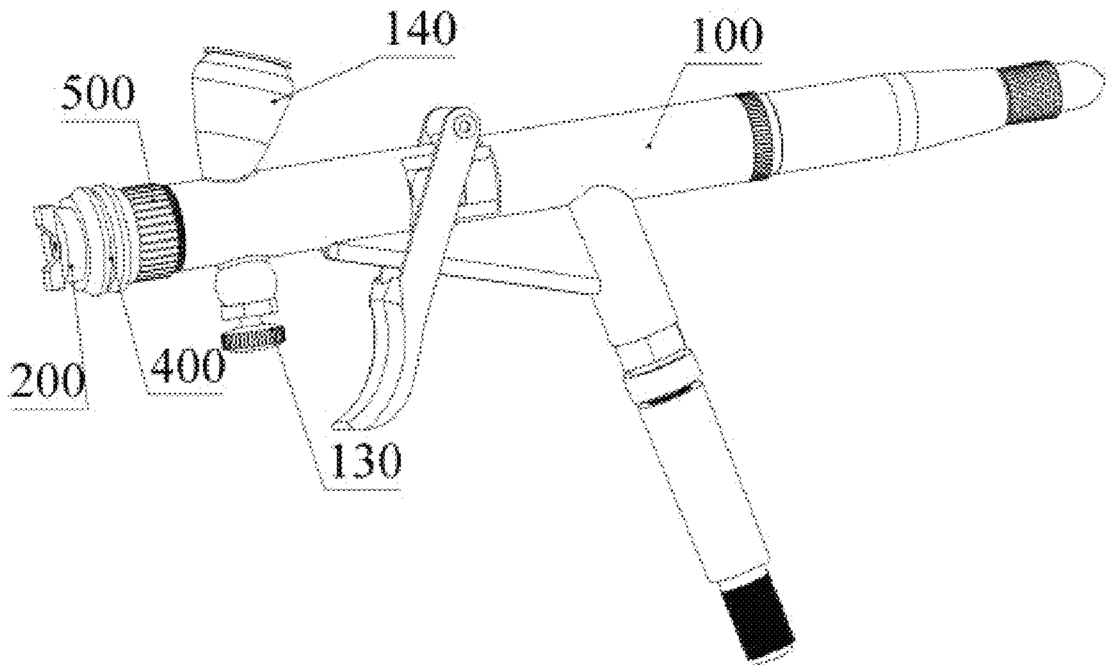
FIG. 2 is a schematic diagram showing the state when the switchable ring of the present disclosure is in the second position.
Figure 3:
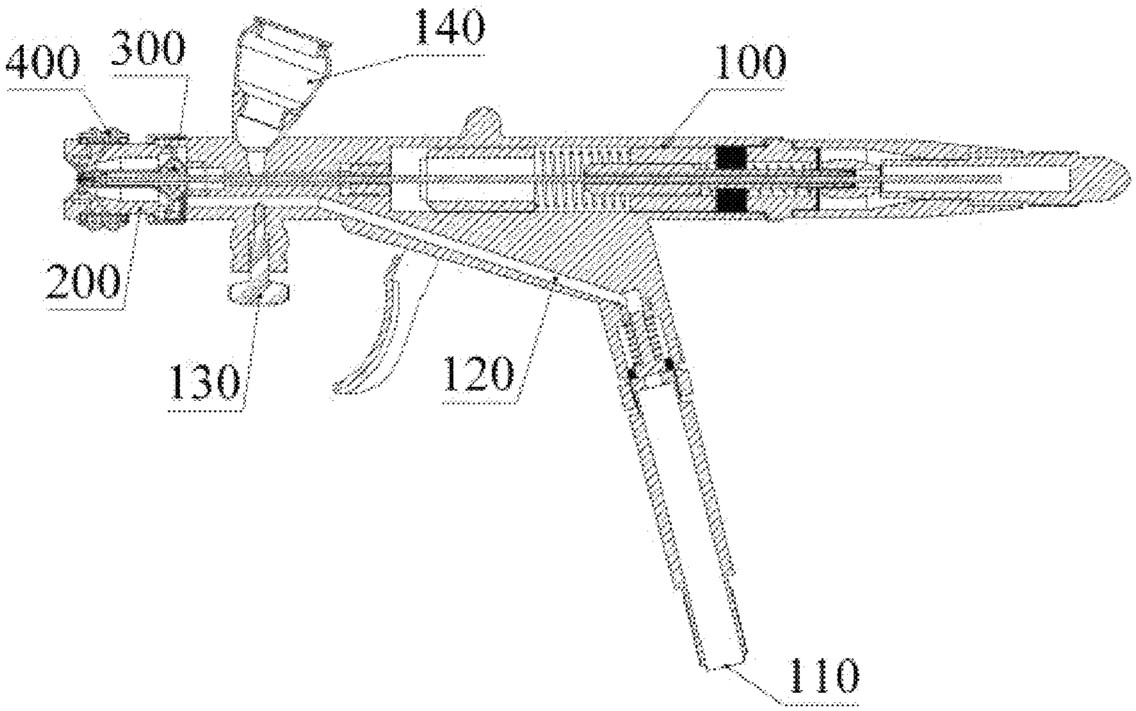
FIG. 3 is a cross-sectional view of the overall structure of the present disclosure.

Referring to FIGS. 1, 2, and 3, in this embodiment, the switchable ring 400 is slidably sleeved on the air cap 200 and can reciprocate along its length to adjust the spray pattern of the atomized liquid. The first position means that the switchable ring 400 is placed at an end of the air cap 200 away from the airbrush body 100, while the second position means that the switchable ring 400 is located at an end of the air cap 200 near the airbrush body 100. Simply sliding the switchable ring 400 enables rapid switching between two atomization modes, enabling rapid switching of the atomization mode by users, effectively accommodating diverse operational requirements and multiple application scenarios.

In other embodiments (not shown), the switchable ring 400 may be rotatably arranged on the air cap 200, with the annular air guide chamber 410 replaced by a single square-shaped chamber. This square chamber also has a first and second position. When the air guide chamber 410 is rotated to the first position, the air delivery channel 210 communicates with the air jet channel 220 through the air guide chamber 410, and the air jet channel 220 ejects gas to shape the atomized liquid droplets, thereby causing the atomized liquid to form a first pattern. When the air guide chamber 410 is rotated to the second position, the air delivery channel 210 and the air jet channel 220 are disconnected from the air guide chamber 410, thereby maintaining the atomized liquid ejected from the nozzle assembly in a second pattern.

Figure 5:
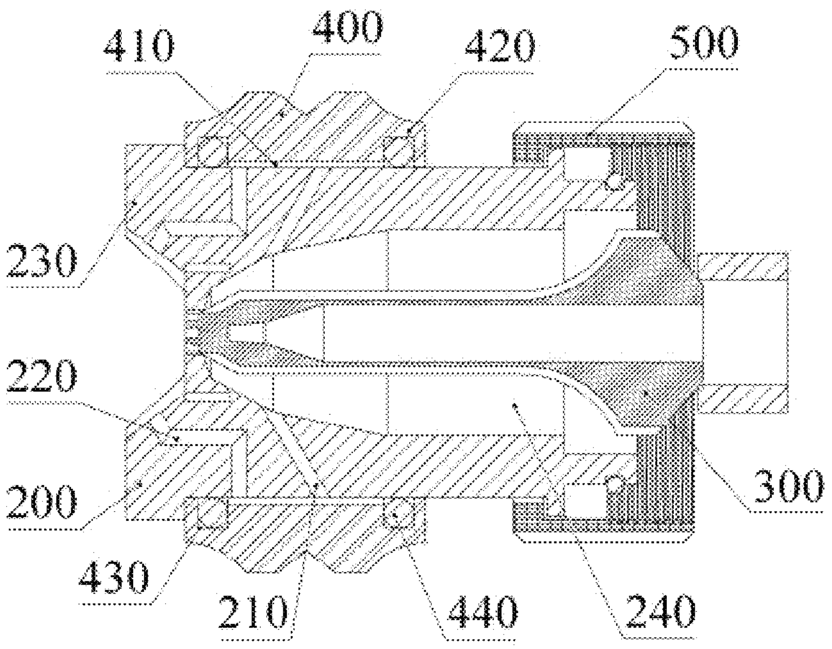
FIG. 5 is a cross-sectional view of the nozzle assembly of the present disclosure.
Figure 6:
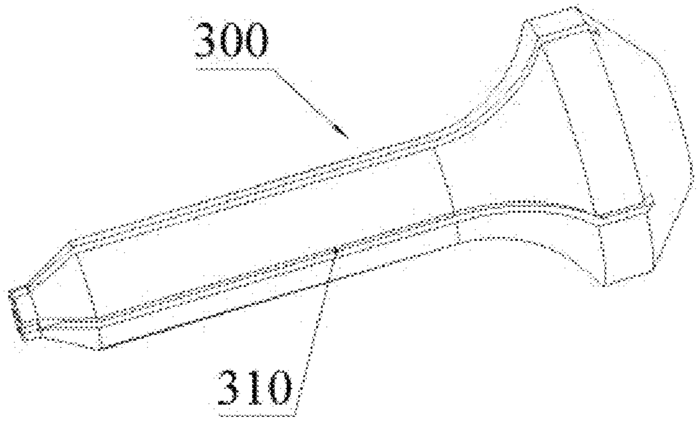
FIG. 6 is a schematic structural diagram of the nozzle of the present disclosure.

As shown in FIGS. 5 and 6, in this embodiment, the air cap 200 is also equipped with a conical nozzle 300 for ejecting liquid. An annular central air passage 240 exists between the nozzle 300 and the air cap 200. The central air passage 240 emits gas to atomize the liquid ejected from the nozzle 300 into a second pattern. Regardless of the position of the switchable ring 400, the central air passage 240 remains unobstructed, ensuring continuous atomization of the liquid into the second pattern. The nozzle 300 is provided with a plurality of air guide grooves 310 along its length direction. The number of air guide grooves 310 is not specifically limited, with four being the preferred configuration. These air guide grooves 310 direct the gas flow, ensuring smoother passage through the channel, thereby preventing wind energy loss and backflow noise caused by gas collisions.

As shown in FIGS. 1, 3, and 5, in this embodiment, the first pattern is a fan-shaped atomized liquid, and the second pattern is a circular atomized liquid. When the switchable ring 400 is in the first position, gas passes through the air delivery channel 210, enters the air jet channel 220 via the air guide chamber 410, and is ejected from the air jet channel 220 located on the atomizing protrusion 230. This reshapes the atomized liquid into a fan shape, suitable for spraying applications requiring large-area uniform coverage. When the switchable ring 400 slides to the second position, the partition part 420 disconnects the air delivery channel 210 from the air jet channel 220, stopping gas flow through the air jet channel 220. At this point, the liquid is only atomized by the gas from the central air passage 240, forming a circular atomized liquid, which is ideal for localized precision spraying and spot spraying applications.

Figure 4:
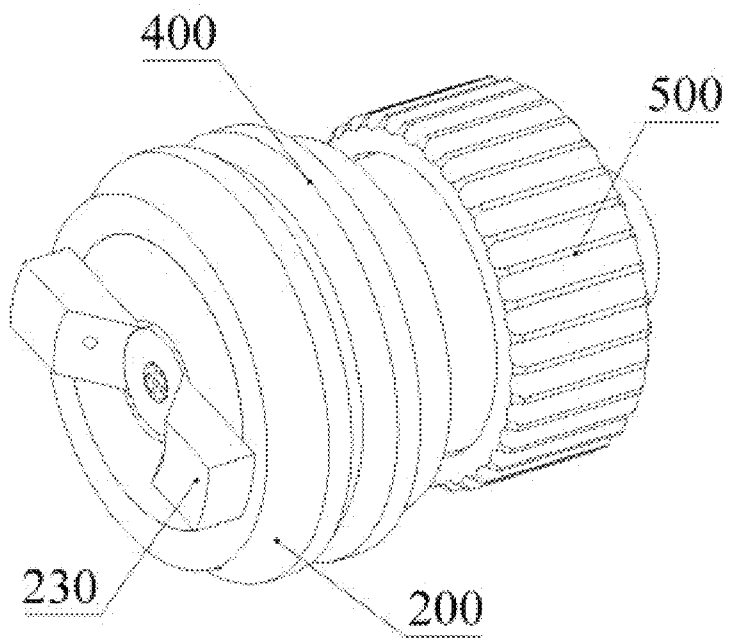
FIG. 4 is a schematic structural diagram of the nozzle assembly of the present disclosure.

Please refer to FIGS. 4 and 5. In this embodiment, both the air delivery channel 210 and the air jet channel 220 are formed on the air cap 200 and extend toward the air guide chamber 410. The air delivery channel 210, air jet channel 220, and atomizing protrusion 230 are symmetrically arranged. One end of the air delivery channel 210 communicates with the central air passage 240, while the other end connects to the air guide chamber 410. The air cap 200 also features an atomizing protrusion 230 at the end away from the airbrush body 100. One end of the air jet channel 220 penetrates the atomizing protrusion 230, while the other end extends toward the air guide chamber 410 and passes through the air cap 200. When the switchable ring 400 is in the first position, gas flows from the central air passage 240 through the air delivery channel 210 into the air guide chamber 410, and finally jets out from the end of the air jet channel 220 located at the atomizing protrusion 230. This shapes the atomized liquid into a fan pattern and performs secondary atomization, breaking the liquid into finer droplets and improving overall atomization. When the switchable ring 400 is in the second position, the partition part 420 disconnects the communication between the air delivery channel 210 and the air jet channel 220. The air jet channel 220 stops airflow and disengages from the air guide chamber 410, while the air delivery channel 210 remains connected to the air guide chamber 410, preventing gas leakage.

Please refer to FIGS. 4 and 5. In this embodiment, both ends of the switchable ring 400 are equipped with partition parts 420, and the air guide chamber 410 is confined between these partition parts. Each partition part 420 includes a mounting slot 430 formed on the inner wall of the switchable ring 400 and a sealing ring 440 installed in the mounting slot 430. The cross-section of the sealing ring 440 is circular or D-shaped, ensuring tight contact with the outer surface of the air cap 200. The air guide chamber 410 achieves sealing through the sealing ring 440, guaranteeing airtight closure while allowing the switchable ring 400 to slide for easy control of opening and blocking of the airflow. This design offers simple operation and excellent sealing performance.

As shown in FIGS. 1 and 3, in this embodiment, the air cap 200 is rotationally connected to the airbrush body 100 via a fastening nut 500. The end of the air cap 200 near the airbrush body 100 is at least partially inserted into the airbrush body 100, with a sealing ring 440 installed on the inserted portion. The air cap 200 is then rotationally fixed to the airbrush body 100 via the fastening nut 500, maintaining a certain gap between the air cap 200 and the airbrush body 100 to allow the air cap 200 to rotate relative to the airbrush body 100. The sealing ring 440 ensures an airtight fixation between the air cap 200 and the airbrush body 100, hence by rotating the air cap 200, the angle of the atomizing protrusion 230 can be switched to meet the requirements for spray width and scattering pattern in different spraying scenarios. The adjustment process does not require disassembling the airbrush; simply rotating the air cap 200 completes the angle adjustment, making the operation simple, efficient, and improving the flexibility and convenience of the airbrush. This design is suitable for complex applications such as multi-angle spraying and precise work in confined spaces.

As shown in FIGS. 1 and 3, in this embodiment, the airbrush body 100 is equipped with an air intake mechanism and an atomizing material cup 140. The air intake mechanism includes an air inlet port 110 and an air inlet channel 120. The air inlet port 110 is used to connect to an external air source, such as a compressed air pipeline or portable air cylinder. One end of the air inlet channel 120 extends internally through the airbrush body 100, connecting to the air inlet port 110, while the other end penetrates into the central air passage 240 inside the airbrush body 100. The air inlet channel 120 is also equipped with an adjustment valve 130, which can be a knob, wheel, or paddle structure. The adjustment valve 130 controls the gas flow rate by altering the cross-sectional size of the air inlet channel 120, such as through the rotational offset of a valve core within the channel, enabling continuous adjustment of the gas passage area. Depending on the spraying requirements, the adjustment valve 130 can be used to regulate the pressure and flow of atomizing gas, thereby modifying the atomization effect and spray range.

In summary, the above description demonstrates that the present disclosure achieves the following technical effects:

By configuring the switchable ring 400 and the controllable air flow channel structure, simply sliding the switchable ring 400 to connect or disconnect the air delivery channel 210 and the air jet channel 220 through the air guide chamber 410 enables switching between two atomization patterns (fan-shaped and circular), fulfilling both large-area coverage and localized precision spraying needs with a single-step operation. Additionally, the rotatable connection between the air cap 200 and the airbrush body 100 allows users to adjust the orientation of the atomizing protrusion 230 by rotating the air cap 200 without removing the nozzle 300, adapting to various spraying angles and width requirements. This simple and quick operation further enhances the airbrush's adaptability and practicality.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. An airbrush with quick switchable atomization mode, comprising a airbrush body and a nozzle assembly installed at an end of the airbrush body, the nozzle assembly being configured to spray atomized liquid, wherein the nozzle assembly comprises an air cap and an adjustment mechanism for regulating a spray pattern of the atomized liquid; and the adjustment mechanism comprises a switchable ring movably arranged on the air cap, with an air guide chamber between the switchable ring and the air cap; and the adjustment mechanism further comprises an air delivery channel and an air jet channel formed on the air cap and extending toward the air guide chamber, wherein the air delivery channel is capable of delivering gas to the air jet channel; and the switchable ring has a first position and a second position, wherein when the switchable ring is in the first position, the air delivery channel and the air jet channel are connected through the air guide chamber, and the air jet channel sprays gas to form a fan-shaped spray pattern of the atomized liquid; and the switchable ring is provided with a partition part, wherein when the switchable ring is in the second position, the partition part blocks the connection between the air delivery channel and the air jet channel, causing the nozzle assembly to spray atomized liquid in a circular pattern.

2. The airbrush with quick switchable atomization mode according to claim 1, wherein the air cap further comprises a conical nozzle for spraying liquid, with an annular central air passage between the nozzle and the air cap, wherein the central air passage sprays gas to atomize the liquid ejected from the nozzle.

3. The airbrush with quick switchable atomization mode according to claim 2, wherein the nozzle is provided with a plurality of air guide grooves along a length direction.

4. The airbrush with quick switchable atomization mode according to claim 2 wherein one end of the air delivery channel is connected to the central air passage, and the other end is connected to the air guide chamber; and an end of the air cap away from the airbrush body is further provided with an atomizing protrusion, wherein one end of the air jet channel penetrates the atomizing protrusion, and the other end extends toward the air guide chamber and penetrates the air cap.

5. The airbrush with quick switchable atomization mode according to claim 4, wherein the air cap is rotatably connected to the airbrush body via a fastening nut, allowing an angle of the atomizing protrusion to be switched by rotating the air cap.

6. The airbrush with quick switchable atomization mode according to claim 4, wherein the air delivery channel, the air jet channel, and the atomizing protrusion are all symmetrically arranged.

7. The airbrush with quick switchable atomization mode according to claim 1, wherein both ends of the switchable ring are provided with partition parts, and the air guide chamber is arranged between the partition parts.

8. The airbrush with quick switchable atomization mode according to claim 7, wherein the partition part comprises a mounting slot provided on an inner wall of the switchable ring and a sealing ring installed in the mounting slot, and the air guide chamber is sealed by the sealing ring.

9. The airbrush with quick switchable atomization mode according to claim 2, wherein the airbrush body is provided with an air intake mechanism, which comprises an air inlet port and an air inlet channel, with one end of the air inlet channel communicating with the air inlet port and the other end communicating with the central air passage; and the air inlet channel is further provided with an adjustment valve, and a cross-sectional size of the air inlet channel is adjustable by regulating the adjustment valve, thereby achieving continuous adjustment of a gas flow rate.

10. The airbrush with quick switchable atomization mode according to claim 1, wherein the airbrush body is further equipped with an atomizing material cup.

11. An airbrush with quick switchable atomization mode, comprising a airbrush body and a nozzle assembly installed at one end of the airbrush body, the nozzle assembly being configured to spray atomized liquid, wherein the nozzle assembly comprises an air cap and an adjustment mechanism for adjusting the spray pattern of the atomized liquid; and the adjustment mechanism comprises a switchable ring movably arranged on the air cap, with an air guide chamber between the switchable ring and the air cap; and the adjustment mechanism further comprises an air jet channel and an air delivery channel that is capable of delivering air to the air jet channel; and the switchable ring has a first position and a second position, wherein when the switchable ring is in the first position, the air delivery channel and the air jet channel are connected through the air guide chamber, and the air jet channel sprays gas, causing the atomized liquid to form a first pattern; and the switchable ring is provided with a partition part, wherein when the switchable ring is in the second position, the partition part blocks the connection between the air delivery channel and the air jet channel, causing the nozzle assembly to spray atomized liquid in a second pattern.

12. The airbrush with quick switchable atomization mode according to claim 11, wherein both the air delivery channel and the air jet channel are provided on the air cap and extend toward the air guide chamber.

13. The airbrush with quick switchable atomization mode according to claim 11, wherein the first pattern is a fan-shaped atomized liquid, and the second pattern is a circular atomized liquid.

14. The airbrush with quick switchable atomization mode according to claim 11, wherein the air cap is further provided with a conical nozzle for spraying liquid, with an annular central air passage between the nozzle and the air cap, and the central air passage sprays gas to atomize the liquid sprayed by the nozzle.

15. The airbrush with quick switchable atomization mode according to claim 14, wherein the nozzle is provided with a plurality of air guide grooves along a length direction.

16. The airbrush with quick switchable atomization mode according to claim 14, wherein one end of the air delivery channel communicates with the central air passage, and the other end communicates with the air guide chamber; and an end of the air cap away from the airbrush body is further provided with an atomizing protrusion, wherein one end of the air jet channel penetrates the atomizing protrusion, and the other end extends toward the air guide chamber and penetrates the air cap.

17. The airbrush with quick switchable atomization mode according to claim 16, wherein the air cap is rotatably connected to the airbrush body via a fastening nut, allowing an angle of the atomizing protrusion to be switched by rotating the air cap.

18. The airbrush with quick switchable atomization mode according to claim 11, wherein both ends of the switchable ring are provided with partition parts, and the air guide chamber is arranged between the partition parts; and the partition part comprises a mounting slot provided on an inner wall of the switchable ring and a sealing ring installed in the mounting slot, and the air guide chamber is sealed by the sealing ring.

19. The airbrush with quick switchable atomization mode according to claim 14, wherein the airbrush body is provided with an air intake mechanism, which comprises an air inlet port and an air inlet channel, with one end of the air inlet channel communicating with the air inlet port, and the other end communicating with the central air passage; and the air inlet channel is further provided with an adjustment valve, and a cross-sectional size of the air inlet channel is adjustable by regulating the adjustment valve, thereby achieving continuous adjustment of a gas flow rate.

20. The airbrush with quick switchable atomization mode according to claim 11, wherein the airbrush body is further equipped with an atomizing material cup.

* * * * *